(12) United States Patent
Nagano et al.

(10) Patent No.: US 9,338,049 B2
(45) Date of Patent: May 10, 2016

(54) SERVER DEVICE, ANNOTATION SYSTEM, ANNOTATION METHOD, AND COMPUTER PROGRAM PRODUCT

(71) Applicants: Shinichi Nagano, Kanagawa (JP); Masayuki Okamoto, Kanagawa (JP); Kouji Ueno, Kanagawa (JP); Kenta Sasaki, Tokyo (JP); Kenta Cho, Kanagawa (JP)

(72) Inventors: Shinichi Nagano, Kanagawa (JP); Masayuki Okamoto, Kanagawa (JP); Kouji Ueno, Kanagawa (JP); Kenta Sasaki, Tokyo (JP); Kenta Cho, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 349 days.

(21) Appl. No.: 13/729,669

(22) Filed: Dec. 28, 2012

(65) Prior Publication Data

US 2013/0262674 A1    Oct. 3, 2013

(30) Foreign Application Priority Data

Mar. 27, 2012   (JP) ................. 2012-071372

(51) Int. Cl.
*H04L 12/24* (2006.01)
*H04L 29/08* (2006.01)

(52) U.S. Cl.
CPC ............. *H04L 41/00* (2013.01); *H04L 67/22* (2013.01)

(58) Field of Classification Search
None
See application file for complete search history.

(56) References Cited

U.S. PATENT DOCUMENTS

| 8,475,367 B1* | 7/2013 | Yuen et al. .................. 600/300 |
| 2006/0195328 A1* | 8/2006 | Abraham et al. ............. 705/1 |
| 2011/0179075 A1* | 7/2011 | Kikuchi ............ G06F 17/30011 707/769 |
| 2012/0038462 A1* | 2/2012 | Adler et al. ................ 340/10.1 |
| 2012/0185417 A1 | 7/2012 | Okamoto |
| 2013/0035929 A1 | 2/2013 | Okamoto et al. |

FOREIGN PATENT DOCUMENTS

| JP | 2009-193465 | 8/2009 |
| JP | 2012-043423 | 3/2012 |

OTHER PUBLICATIONS

Japanese Office Action for Japanese Patent Application No. 2012-071372 mailed on Jul. 1, 2014.
Japanese Office Action for Japanese Patent Application No. 2012-071372 mailed on Apr. 15, 2014.
Japanese Office Action for Japanese Patent Application No. 2012-071372 mailed on Jan. 6, 2015.

* cited by examiner

*Primary Examiner* — Chris Parry
*Assistant Examiner* — Stephen Houlihan
(74) *Attorney, Agent, or Firm* — Amin, Turocy & Watson LLP; Gregory Turocy (57) ABSTRACT

According to an embodiment, a server device includes a first registering unit, a second registering unit, and a providing unit. The first registering unit is configured to acquire first action information regarding an action performed by a first user from a client device, and register the first action information in an action information storage unit in which pieces of action information of users are stored in association with labels of the respective pieces of action information. The second registering unit is configured to specify at least one piece of action information similar to the first action information among the pieces of action information, and register the label associated with the specified piece of action information in the action information storage unit in association with the first action information. The providing unit is configured to provide the label associated with the first action information to the client device.

8 Claims, 10 Drawing Sheets

| ACTION ID | TIME | PLACE | RESOURCE |
|---|---|---|---|
| A005 | 2011/09/15(Thu) 10:00 TO 12:00 | | RECORD0915.txt |

FIG.4

| ACTION ID | TIME | KEYWORD | LABEL |
|---|---|---|---|
| A005 | 2011/09/15(Thu) 10:00 TO 12:00 | MANAGER SAITO, SPECIFICATION, PERFORMANCE, EVALUATION, ESTIMATE, PRICE | |

FIG.5

| ACTION ID | USER ID | TIME | KEYWORD | LABEL |
|---|---|---|---|---|
| A001 | E001 | 2011/09/01(Thu) 10:00 TO 12:00 | HAMAMATSUCHO STATION, HEAD OFFICE, TELEVISION DIVISION, MANAGER SAITO, ROAD MAP | COMMER- CIALIZATION, IMAGING TECHNOLOGY |
| A002 | E004 | 2011/09/01(Thu) 10:00 TO 12:00 | HAMAMATSUCHO STATION, COMPANY S, PRODUCT, USAGE, PERFORMANCE, PRICE, ESTIMATE | CONSULTATION |
| A003 | E001 | 2011/09/08(Thu) 10:00 TO 12:00 | HAMAMATSUCHO STATION, HEAD OFFICE, TELEVISION DIVISION, MANAGER SAITO, SPECIFICATION, PERFORMANCE, DEFICIENCY | COMMER- CIALIZATION |
| A004 | E005 | 2011/09/13(Mon) 13:00 TO 14:00 | SHINAGAWA STATION, COMPANY S, PRODUCT, REESTIMATE | CONSULTATION |
| A005 | E002 | 2011/09/15(Thu) 10:00 TO 12:00 | MANAGER SAITO, SPECIFICATION, PERFORMANCE, EVALUATION, ESTIMATE, PRICE | |

| DEPARTMENT ID | DEPARTMENT NAME |
|---|---|
| BU001 | DEPARTMENT OF TECHNOLOGY SALES & MARKETING |
| BU002 | TECHNOLOGY DIVISION |
| BU003 | MARKETING DIVISION |

FIG.8

| EMPLOYEE ID | EMPLOYEE NAME | DEPARTMENT ID |
|---|---|---|
| E001 | TANAKA | BU001 |
| E002 | YAMADA | BU002 |
| E003 | SUZUKI | BU002 |
| E004 | SATO | BU003 |
| E005 | KOBAYASHI | BU003 |

FIG.9

| UPPER DEPARTMENT ID | LOWER DEPARTMENT ID |
|---|---|
| BU001 | BU002 |
| BU001 | BU003 |

FIG.10

| DEPARTMENT ID | EMPLOYEE ID |
|---|---|
| BU001 | E001 |
| BU002 | E002 |
| BU003 | E004 |

FIG.11

2011/09/15(Thu)

| TIME | LABEL |
|---|---|
| 10:00 TO 12:00 | COMMERCIALIZATION, IMAGING TECHNOLOGY |
| 12:00 TO 13:00 | LUNCH |
| 13:00 TO 13:30 | MOVING BY SUBWAY |
| 13:30 TO 14:00 | PRESENTATION, REVIEWING OF COMMERCIALIZATION |
| 14:00 TO 17:00 | TESTING |

FIG.13 ized user's action.

SERVER DEVICE, ANNOTATION SYSTEM, ANNOTATION METHOD, AND COMPUTER PROGRAM PRODUCT

CROSS-REFERENCE TO RELATED APPLICATION

This application is based upon and claims the benefit of priority from Japanese Patent Application No. 2012-071372, filed on Mar. 27, 2012; the entire contents of which are incorporated herein by reference.

FIELD

Embodiments described herein relate generally to a server device, an annotation system, an annotation method, and a computer program product.

BACKGROUND

Conventionally, an annotation technology is known in which a user's action is recognized based on a user's operating information regarding a terminal and output information of sensors mounted on the terminal, and assigns an appropriate label to the recognized user's action.

However, in such an annotation technology, the labels to be assigned to the user's own actions are generally limited to those defined in advance or those determined by the user in mind. For this reason, even in the annotation field, it may be considered that the labeling will be carried out well by utilizing a technology such as a social tagging technology on the Web in which the different labels are assigned for the same contents by each individual of a plurality of users.

However, if the user's actions are opened to unspecified individuals to make the labels assigned through simply applying the social tagging technology to the above-mentioned annotation technology, it is not preferable from the viewpoints of information security and protection of personal information.

DETAILED DESCRIPTION

According to an embodiment, a server device includes a first registering unit, a second registering unit, and a providing unit. The first registering unit is configured to acquire first action information that is a piece of action information regarding an action performed by a first user from a client device used by the first user, and register the first action information in an action information storage unit in which pieces of action information of a plurality of users are stored in association with labels of the respective pieces of action information. The second registering unit is configured to specify at least one piece of action information similar to the first action information among the pieces of action information, and register the label associated with the specified piece of action information in the action information storage unit in association with the first action information. The providing unit is configured to provide the label associated with the first action information to the client device.

Herein below, embodiments will be described in detail with reference to the accompanying drawings.

Figure 1:
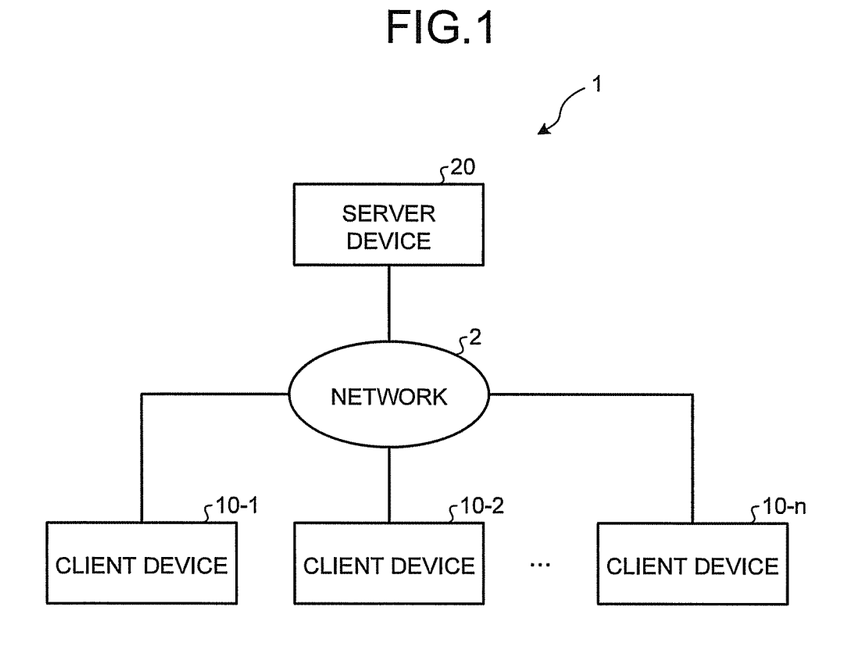
FIG. 1 is a diagram illustrating an example of an annotation system according to an embodiment.

FIG. 1 is a diagram illustrating an example of a configuration of an annotation system 1 according to an embodiment. As illustrated in FIG. 1, the annotation system 1 is provided with a plurality of client devices 10-1 to 10-n (n≥2) and a server device 20. The client devices 10-1 to 10-n and the server device 20 are connected to each other through a network 2. The network 2, for example, may be realized by a local area network (LAN), the Internet, or the like.

The plurality of client devices 10-1 to 10-n may be terminals used or carried with by a user. For example, a mobile terminal such as a notebook personal computer (PC) and a smart phone, a tablet terminal, and the like are included in the client devices. Further, since the configurations and operations of the client devices 10-1 to 10-n are similar to each other, the following description will be made focusing on the client device 10-1. In addition, herein below, the respective users of the client devices 10-1 to 10-n will be referred to as a first user to the n$^{th}$ user.

Figure 2:
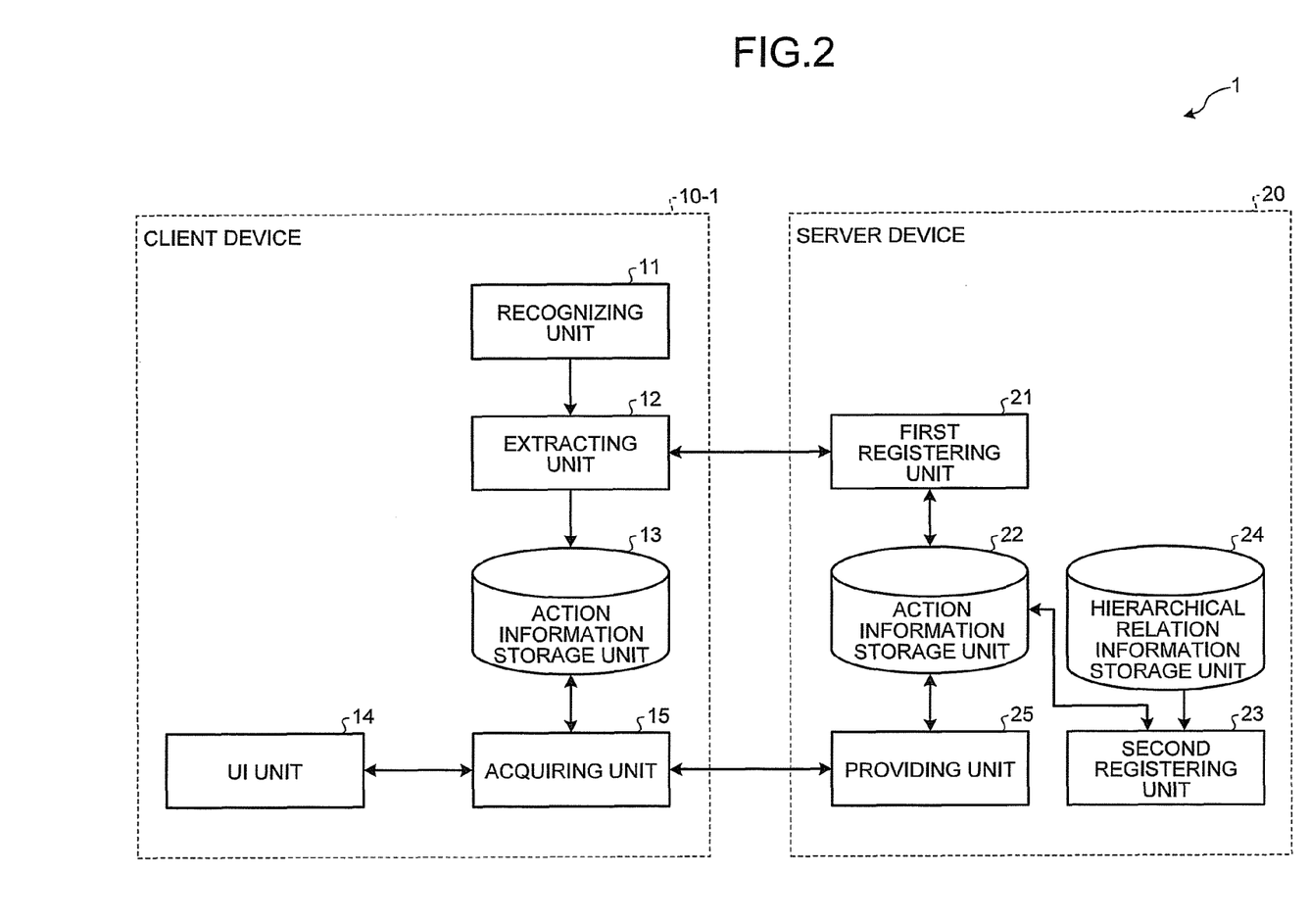
FIG. 2 is a diagram illustrating an example of a client device and a server device according to the embodiment.

FIG. 2 is a diagram illustrating an example of configurations of the client device 10-1 and the server device 20 according to the embodiment. As illustrated in FIG. 2, the client device 10-1 includes a recognizing unit 11, an extracting unit 12, an action information storage unit 13, a UI (User Interface) unit 14, and an acquiring unit 15.

The recognizing unit 11, the extracting unit 12, and the acquiring unit 15, for example, may be realized by programs which are executed on a processing device such as a central processing unit (CPU), that is, software; by hardware such as an integrated circuit (IC); or by a combination of software and hardware. The action information storage unit 13, for example, may be realized by at least one of magnetically, optically, and electrically storable storage devices, such as a hard disk drive (HDD), a solid state drive (SSD), and a memory card. The UI unit 14, for example, may be realized by a display device such as a liquid crystal display or a touch panel display, and operating devices such as a keyboard, a mouse, a key button, and a touch panel.

The recognizing unit 11 acquires any piece of operating information of a user's operation on the client device 10-1, and sensor information of a sensor (not illustrated) which is built in the client device 10-1. Herein, the sensor, for example, corresponds to a positioning sensor such as a Global Positioning System (GPS) sensor or an acceleration sensor. Then, the recognizing unit 11 recognizes an action of a first user who is using the client device 10-1 based on the acquired operating information or the sensor information, and represents the recognized action of the first user using linguistic information such as characters.

In the embodiment, the recognizing unit 11 represents the recognized action of the first user using an action ID, a time, a place, a resource, and the like. The action ID is an identifier for identifying the recognized action; and for the action ID, the recognizing unit 11 assigns an identifier to the recognized action for uniquely identifying the action in the client device 10-1. The time represents a time at which the recognized action is performed; and for the time, the recognizing unit 11 assigns a time measured by the client device 10-1 or a time acquired from a Network Time Protocol (NTP) server (not illustrated). The place represents a place at which the recognized action is performed and can be represented by a current position, a moving orientation, a moving speed, and the like which are obtained based on the sensor information. The resource is an element (data) related to the recognized action; and examples of the resource set by the recognizing unit 11 include electronic mails, files, web pages, and the like created or browsed in a time period when the action is performed.

Figure 3:
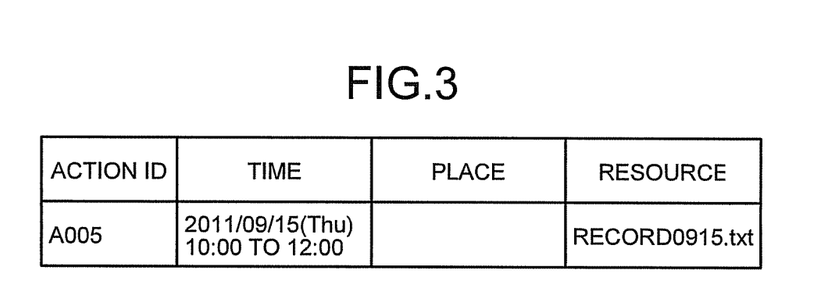
FIG. 3 is a diagram illustrating an example of a first user's action which is recognized by a recognizing unit according to the embodiment.

FIG. 3 is a diagram illustrating an example of the first user's action which is recognized by the recognizing unit 11 according to the embodiment. In the example illustrated in FIG. 3, the recognizing unit 11 represents the recognized action of the first user using the action ID, the time, and the resource. Further, a text file created by the first user's action is set to the resource.

The extracting unit 12 extracts feature data representing the features of the first user's action which is recognized by the recognizing unit 11. In the embodiment, each feature is a keyword which is included in the resource or the place associated with the first user's action recognized by the recognizing unit 11; and the extracting unit 12 extracts the keyword from the resource or the place using morphological analysis or a built-in rule. Then, the extracting unit 12 generates action information regarding the first user's action by associating the action ID and the time which are generated by the recognizing unit 11 with the extracted keyword, registers the generated action information in the action information storage unit 13, and also transmits the generated action information to the server device 20 through the network 2. Further, the extracting unit 12 transmits the generated action information to the server device 20 with a user ID (an example of first user identification information) of the first user assigned thereto.

The action information storage unit 13 stores the action information of the first user with being associated with a label of the action information. The label is a character string representing the content of the action information.

Figure 4:
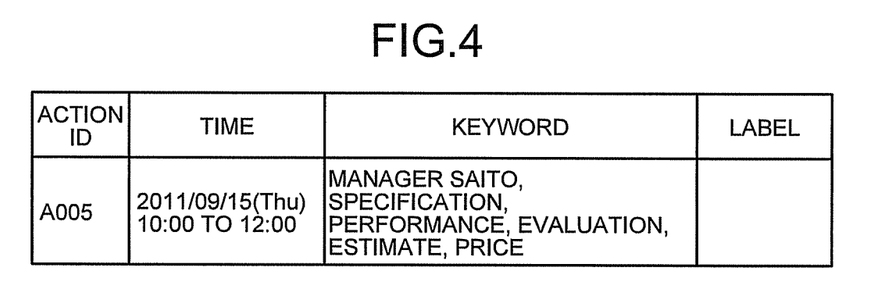
FIG. 4 is a diagram illustrating an example of information in an action information storage unit of the client device according to the embodiment.

FIG. 4 is a diagram illustrating an example of information which is stored in the action information storage unit 13. In the example illustrated in FIG. 4, the action information storage unit 13 stores the action information (the action ID, the time, and the keyword) registered by the extracting unit 12. Further, in the example illustrated in FIG. 4, while the label is not associated with the action information, the label will be associated therewith by the acquiring unit 15 to be described below.

Herein, the description about the client device 10-1 will be suspended once to describe the server device 20.

As illustrated in FIG. 2, the server device 20 includes a first registering unit 21, an action information storage unit 22, a second registering unit 23, a hierarchical relation information storage unit 24, and a providing unit 25.

The first registering unit 21, the second registering unit 23, and the providing unit 25, for example, may be realized by programs which are executed on a processing device, such as a CPU, that is, software; by hardware such as an IC; or by a combination of software and hardware. The action information storage unit 22 and the hierarchical relation information storage unit 24, for example, may be realized by at least one of magnetically, optically, or electrically storable storage devices, such as an HDD, the SSD, and a memory card.

The first registering unit 21 receives the action information of the first user to the action information of the $n^{th}$ user respectively from the client devices 10-1 to 10-$n$ through the network 2, and registers the received action information in the action information storage unit 22. Further, the action information of the first user to the action information of the $n^{th}$ user each includes the user ID (an example of the user identification information) for identifying a user as an action subject in addition to the action ID, the time, and the keyword. For example, the first registering unit 21 acquires the action information (herein below, refers to as first action information) to which the user ID of the first user is assigned from the client device 10-1, and registers the acquired action information in the action information storage unit 22.

The action information storage unit 22 stores the action information of the first user to the $n^{th}$ user in association with the label of the action information.

Figure 5:
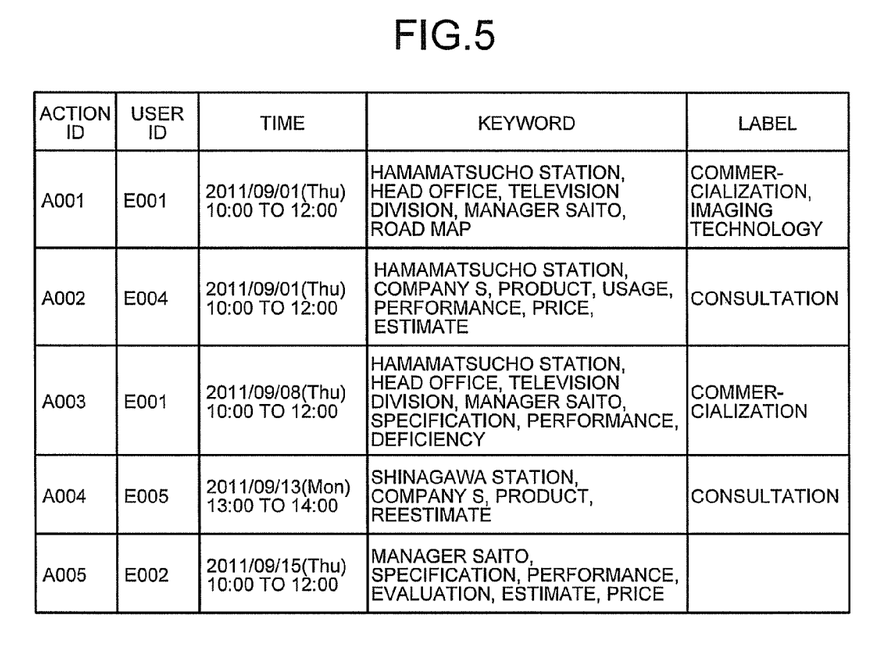
FIG. 5 is a diagram illustrating an example of information stored in an action information storage unit of a server device according to the embodiment.

FIG. 5 is a diagram illustrating an example of information which is stored in the action information storage unit 22 according to the embodiment. In the example illustrated in FIG. 5, the action information storage unit 22 stores the action information (the action ID, the user ID, the time, and the keyword), to which the user ID is assigned, in association with the label of the action information. Further, in the example illustrated in FIG. 5, the first action information (the action information of the action ID "A005" and the user ID "E002") which has been registered by the first registering unit 21 is not associated with the label, but the other action information is associated with the label. However, the first action information as well will be associated with the label by the second registering unit 23 to be described below.

The second registering unit 23 specifies action information which is similar to the action information not associated with the label in the action information storage unit 22, among a plurality of pieces of action information stored in the action information storage unit 22. Specifically, the second registering unit 23 specifies action information of which the keyword is similar to that of the action information not associated with the label in the action information storage unit 22 among the pieces of action information stored in the action information storage unit 22. In the embodiment, the similarity of the action information (the keyword) represents the number of the matched keywords. As the number of the matched keywords increases, the similarity increases.

Herein, the hierarchical relation information storage unit 24 will be described. The hierarchical relation information storage unit 24 stores hierarchical relation information which defines a hierarchical relation between users using the user IDs. In the embodiment, the description will be made in connection with the case in which the hierarchical relation information is organization information defining a hierarchical relation within an organization of the users belonging to the organization, but not limited thereto.

The hierarchical relation information storage unit 24, for example, stores department information of the organization using the annotation system 1 and the organization information which defines personal relations. The organization information, for example, is information representing an organizational structure illustrated in FIG. 6. In the organizational structure illustrated in FIG. 6, a technology division and a marketing division are disposed under a technology sales & marketing department, in which Mr. Tanaka the chief belongs to the technology sales & marketing department, Mr. Suzuki and Mr. Yamada the chief belong to the technology division, and Mr. Kobayashi and Mr. Sato the chief belong to the marketing division. Herein, since the technology sales & marketing department is in the hierarchical relation with the technology division and the marketing division, Mr. Tanaka of the technology sales & marketing department is in the hierarchical relation with Mr. Yamada and Mr. Suzuki of the technology division, and with Mr. Sato and Mr. Kobayashi of the marketing division. Further, even in the technology division, the hierarchical relation may be established between Mr. Yamada the chief and Mr. Suzuki. Similarly, even in the marketing division, the hierarchical relation may be established between Mr. Sato the chief and Mr. Kobayashi.

Figure 6:
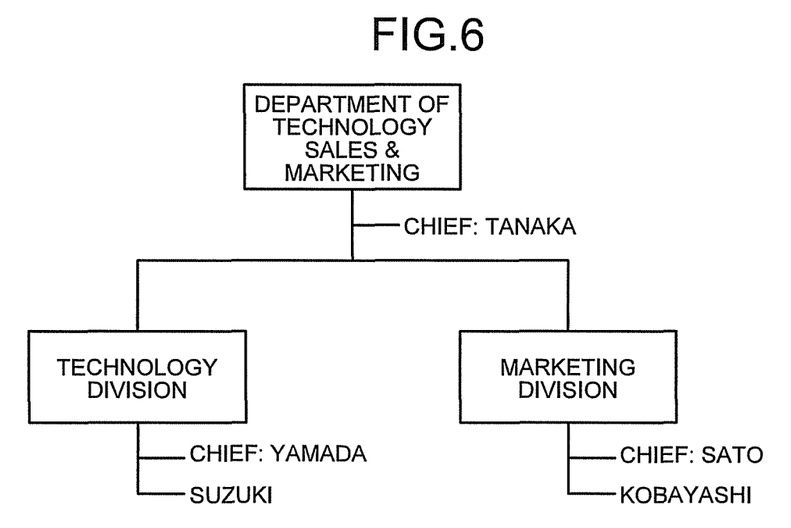
FIG. 6 is a diagram illustrating an example of structure of organizations according to the embodiment.
Figure 7:
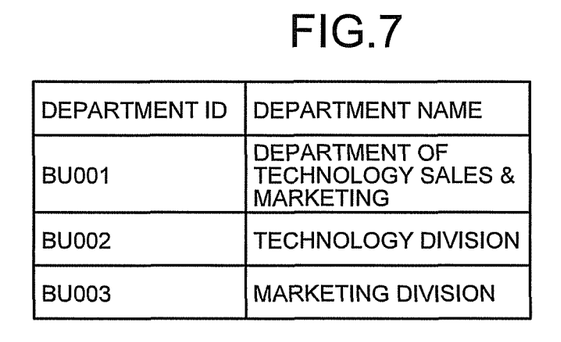
FIG. 7 is a diagram illustrating an example of a department table according to the embodiment.
Figure 8:
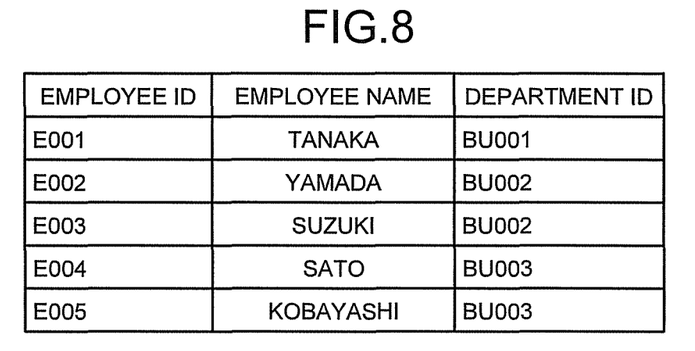
FIG. 8 is a diagram illustrating an example of an employee table according to the embodiment.
Figure 9:
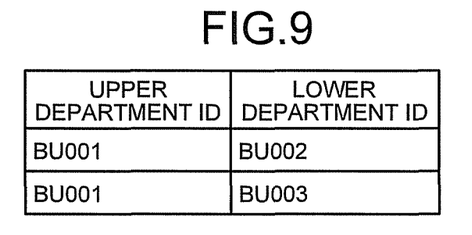
FIG. 9 is a diagram illustrating an example of a department relation table according to the embodiment.
Figure 10:
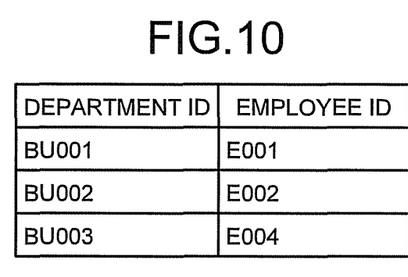
FIG. 10 is a diagram illustrating an example of a department chief table according to the embodiment.

In the embodiment, the hierarchical relation information storage unit 24 stores a department table illustrated in FIG. 7, an employee table illustrated in FIG. 8, a department relation table illustrated in FIG. 9, and a department chief table illustrated in FIG. 10, as the organization information representing the organizational structure illustrated in FIG. 6. The department table illustrated in FIG. 7 lists department IDs, which are identifiers of department names, with being associated with the department name. The employee table illustrated in FIG. 8 lists employee IDs (which correspond to the user IDs), which are identifiers of employees, with being associated with employee names and the department IDs of the departments to which the employees belong. The department relation table illustrated in FIG. 9 lists upper department IDs of the upper departments with being associated with lower department IDs of the lower departments. The department chief table illustrated in FIG. 10 lists the department IDs in association with the employee IDs of the chiefs of the departments represented by the department IDs. Therefore, the organizational structure illustrated in FIG. 6 can be specified based on the tables illustrated in FIGS. 7 to 10, and it is possible to establish the hierarchical relation between Mr. Tanaka of the technology sales & marketing department and Mr. Yamada and Mr. Suzuki of the technology division, and Mr. Sato and Mr. Kobayashi of the marketing division.

Herein, the description will be back to the second registering unit 23 to describe the label registration of the second registering unit 23 in more detail. The second registering unit 23 specifies action information most similar to the action information which is not associated with the label in the action information storage unit 22, among the pieces of action information stored in the action information storage unit 22. In addition, the second registering unit 23 refers to the organizational structure stored in the hierarchical relation information storage unit 24 to extract the action information including user identification information being in the hierarchical relation with the user ID, which is included in the action information having no association with the label, among the specified action information. Furthermore, the second registering unit 23 specifies action information of which the user ID is matched with that included in the action information most similar to the action information having no association with the label among the extracted action information, and with which any one of labels associated with the most similar action information is associated, among the pieces of the action information stored in the action information storage unit 22. Then, the second registering unit 23 registers the label associated with the specified action information and the label associated with the most similar action information in the action information storage unit 22 in association with the action information having no association with the label.

For example, the second registering unit 23 specifies the action information having the action ID "A002" and the action information having the action ID "A003," as the action information of which the keyword is most similar to that of the action information having the action ID "A005" as being the first action information, among the pieces of the action information illustrated in FIG. 5. In addition, the second registering unit 23 extracts the action information including the user ID being in the hierarchical relation with the user ID "E002" of the first action information among the action information having the action ID "A002" and the action information having the action ID "A003" referring to the tables illustrated in FIGS. 7 to 10. Herein, referring to the table illustrated in FIGS. 7 to 10, since the user ID "E002" is in the hierarchical relation with the user ID "E001," the second registering unit 23 extracts the action information having the action ID "A003." Further, since the action information of the action ID "A001" is matched with the action information having the extracted action ID "A003" in the user ID "E001" and the label associated with the action information of the extracted action ID "A003" is associated with "Commercialization", the second registering unit 23 specifies the action information of the action ID "A001" among the pieces of action information illustrated in FIG. 5. Further, since the extracted action information is a piece of action information having the action ID "A003", the second registering unit 23 has the action information having the action ID "A003" as second action information which is the action information most similar to the first action information. Then, the second registering unit 23 registers the labels "Commercialization" and "Imaging Technology" associated with the action information having the action ID "A001" and the label "Commercialization" associated with the action information having the action ID "A003" in the action information storage unit 22 in association with the action information having the action ID "A005" as being the first action information.

Further, the second registering unit 23 may register the label, which is associated with the action information similar to the action information having no association with the label in the action information storage unit 22, in the action information storage unit 22 in association with the action information having no association with the label.

In addition, the second registering unit 23 may register the label, which is associated with the action information including the user identification information being in the hierarchical relation with the user ID included in the action information having no association with the label, in the action information storage unit 22 in association with the action information having no association with the label.

In addition, the second registering unit 23 may not extract the action information referring to the organization information stored in the hierarchical relation information storage unit 24, that is, the action information including the user identification information being in the hierarchical relation with the user ID included in the action information having no association with the label.

The providing unit 25 provides the label associated with the action information by the second registering unit 23 to a client device which is an action information source. For example, when the first action information to which the user ID of the first user is assigned is transmitted from the client device 10-1 and the label of the first action information is requested, the providing unit 25 acquires the labels "Commercialization" and "Imaging Technology" associated with the first action information from the action information storage unit 22, and provides the acquired labels to the client device 10-1.

Herein, the description will be back to the client device 10-1.

The UI unit 14 realizes a user interface to the client device 10-1, thereby issuing an instruction to display an action history of the first user or displaying the action history of the first user.

When the instruction to display the action history of the first user is issued from the UI unit 14, the acquiring unit 15 determines whether all pieces of the display-targeted action information in the action information of the first user stored in the action information storage unit 13 are associated with the labels. If there is action information having no association with the label in the display-targeted action information, the corresponding action information is transmitted to the server device 20 to request the label of the action information, and then after acquiring the label, the corresponding action information is registered in the action information storage unit 13 in association with the acquired label. For example, if the action information of the first user stored in the action information storage unit 13 is the first action information illustrated in FIG. 4, the acquiring unit 15 acquires the labels "Commercialization" and "Imaging Technology" associated with the first action information from the server device 20, and registers the acquired labels "Commercialization" and "Imaging Technology" in the action information storage unit 13 in association with the first action information. Then, the acquiring unit 15 acquires all pieces of display-targeted action information and the labels from the action information storage unit 13, and generates an action history screen using the acquired action information and the labels to display the action history in the UI unit 14. On the other hand, if all pieces of display-targeted action information is associated with the labels, the acquiring unit 15 acquires the corresponding display-targeted action information and the labels, and generates the action history screen using the acquired action information and the labels to display the action history in the UI unit 14.

Figure 11:
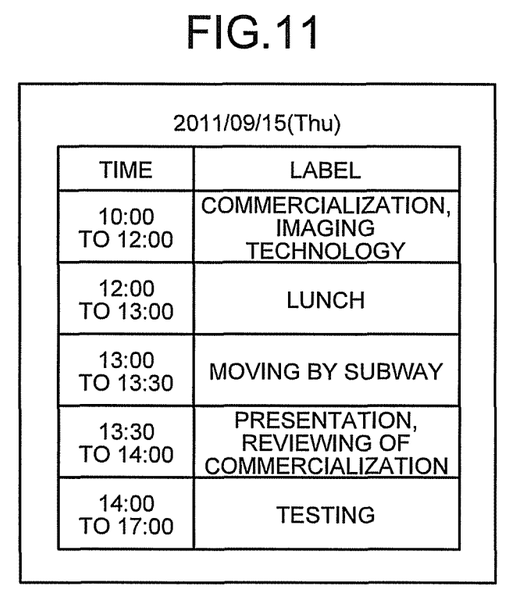
FIG. 11 is a diagram illustrating an example of an action history screen according to the embodiment.

FIG. 11 is a diagram illustrating an example of the action history screen according to the embodiment. The action history screen illustrated in FIG. 11 lists the action history of the first user, performed on Thursday, Sep. 15, 2011, in which times and labels included in Thursday, Sep. 15, 2011 are displayed in association with each other. Further, the UI unit 14 may be configured to add and edit the labels on the action history screen.

Figure 12:
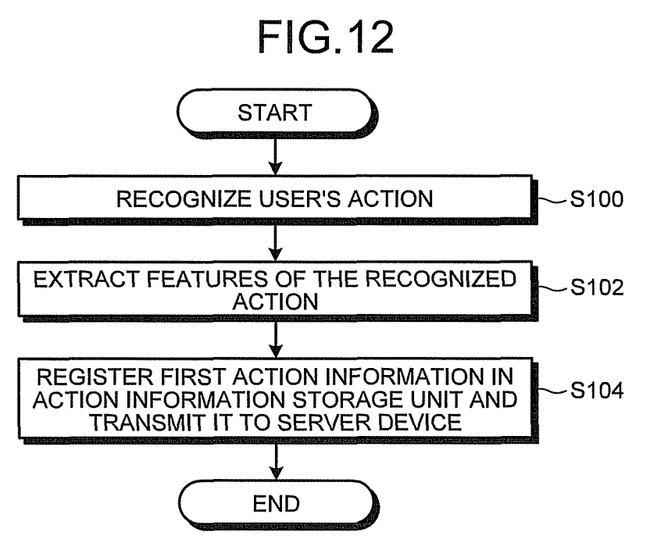
FIG. 12 is a flowchart illustrating an example of an action recognizing process according to the embodiment.

FIG. 12 is a flowchart illustrating an example of an action recognizing process performed by the client device 10-1 according to the embodiment.

First, the recognizing unit 11 recognizes the action of the first user who is using the client device 10-1 based on the operating information, the sensor information, and the like, and then displays the recognized action of the first user using the action ID, the time, the place, the resource, and the like (step S100).

The extracting unit 12 extracts the keyword based on the resource and the place, as the feature data representing the feature of the first user's action recognized by the recognizing unit 11 (step S102).

The extracting unit 12 generates the action information having the action ID "A005", which is the first action information of the first user, in association with the action ID, the time generated by the recognizing unit 11, and the extracted keyword. Then, the generated action information is registered in the action information storage unit 13, and also transmitted to the server device 20 through the network 2 (step S104).

Figure 13:
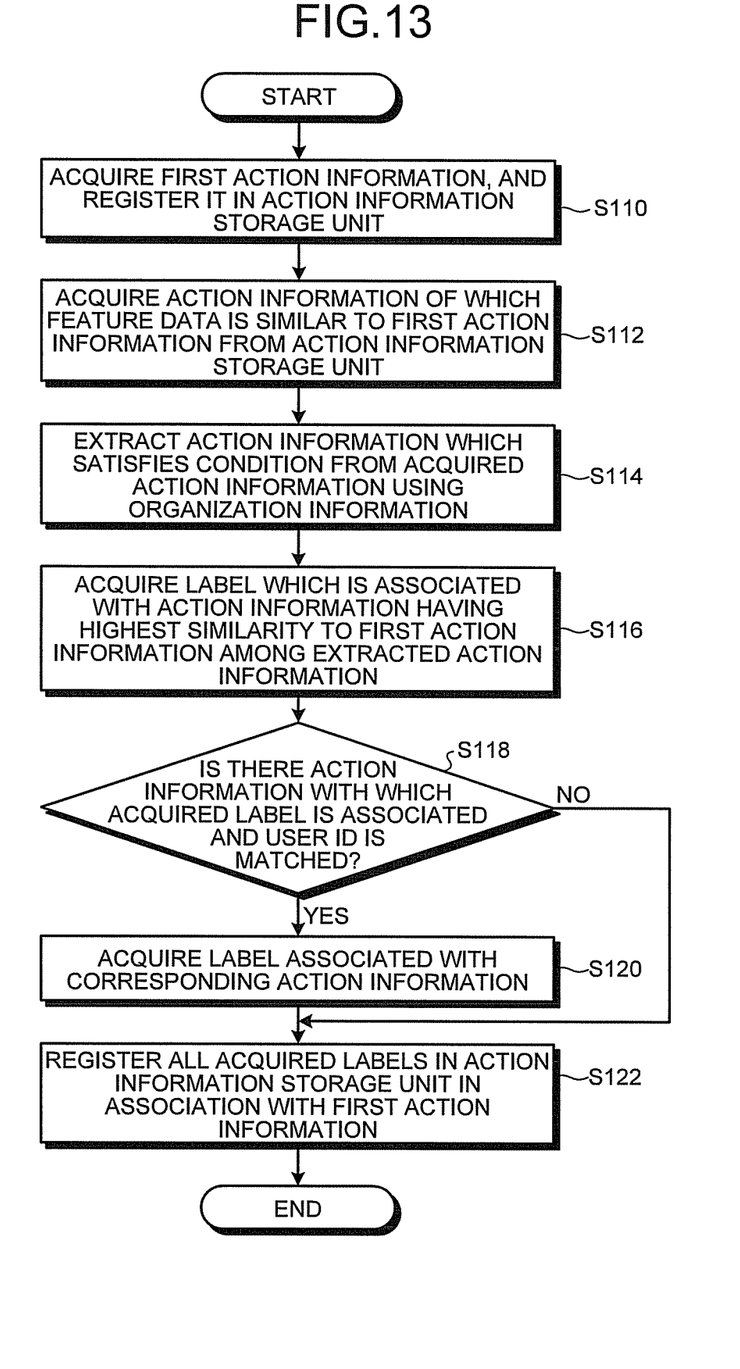
FIG. 13 is a flowchart illustrating an example of an annotation process according to the embodiment.

FIG. 13 is a flowchart illustrating an example of an annotation process performed by the server device 20 according to the embodiment.

The first registering unit 21 acquires the action information having the action ID "A005", which is the first action information assigned with the user ID of the first user, from the client device 10-1. The acquired action information is registered in the action information storage unit 22 (step S110).

The second registering unit 23 acquires, as the action information of which the keyword is most similar to that of the action information having the action ID "A005" which is the first action information, the action information having the action ID "A002" and the action information having the action ID "A003" among the pieces of action information illustrated in FIG. 5 which are stored in the action information storage unit 22 (step S112).

The second registering unit 23 extracts the action information having the action ID "A003" including the user ID "E001" being in the hierarchical relation with the user ID "E002" of the first action information from the action information having the action ID "A002" and the action information having the action ID "A003" which have been acquired, using the organizational structure (the tables illustrated in FIGS. 7 to 10) stored in the hierarchical relation information storage unit 24 (step S114).

The second registering unit 23 acquires the label "Commercialization" which is associated with the action information having the action ID "A003" of the highest similarity to the action information having the action ID "A005" which is the first action information, among the extracted action information (step S116).

The second registering unit 23 determines whether there is action information with which the acquired label "Commercialization" is associated and the user ID is matched with that of the action information having the action ID "A003" as the user ID "E001" among the pieces of action information illustrated in FIG. 5 which are stored in the action information storage unit 22 (step S118).

Herein, since the action information having the action ID "A001" is satisfied with the condition (Yes in step S118), the second registering unit 23 acquires the labels "Commercialization" and "Imaging Technology" associated with the action information having the action ID "A001" (step S120).

Further, if there is no action information satisfying the condition (No in step S118), the second registering unit 23 skips the process in step S120.

The second registering unit 23 registers all the acquired labels "Commercialization" and "Imaging Technology" in the action information storage unit 22 in association with the action information having the action ID "A005" which is the first action information (step S122).

Figure 14:
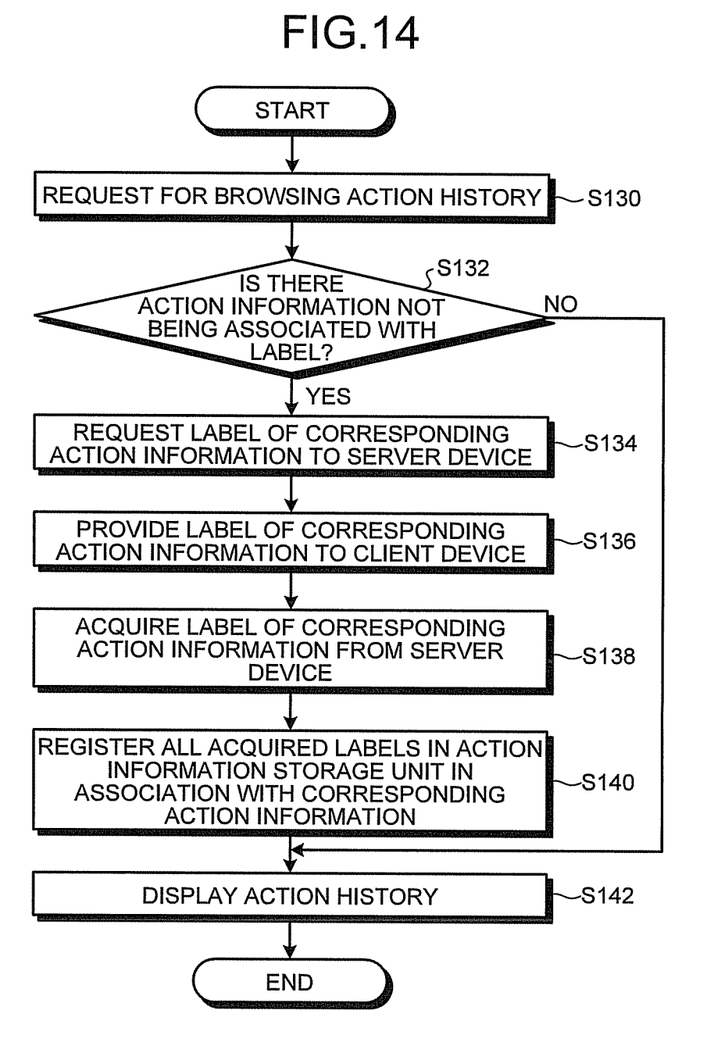
FIG. 14 is a flowchart illustrating an example of an action history screen displaying process according to the embodiment.

FIG. 14 is a flowchart illustrating an example of an action history screen displaying process performed by the annotation system 1 according to the embodiment.

First, the UI unit 14 makes a request for browsing the action history of the first user (step S130).

The acquiring unit 15 determines whether there is display-targeted action information having no association with the label among the action information of the first user stored in the action information storage unit 13 (step S132). Further, if there is no action information having no association with the label (No in step S132), the procedure proceeds to step S142.

If there is action information having no association with the label (Yes in step S132), the acquiring unit 15 makes a request for the label of the corresponding action information from the server device 20 (step S134).

The providing unit 25 of the server device 20 acquires the label of the corresponding action information from the action information storage unit 22, and provides the acquired label to the client device 10-1 (step S136).

The acquiring unit 15 of the client device 10-1 acquires the label of the corresponding action information from the server device 20 (step S138).

The acquiring unit 15 registers the acquired label in the action information storage unit 13 in association with the corresponding action information (step S140).

The acquiring unit 15 acquires all the display-targeted action information and the labels from the action information storage unit 13. Further, the acquiring unit 15 generates the action history screen using the action information and the labels which have been acquired, and displays the generated action history screen in the UI unit 14 (step S142).

As described above, in the embodiment, the server device 20 accumulates the action information and the label for each of the client devices 10-1 to 10-n, and assigns the label to action information newly acquired from the client device using the accumulated action information and the label. For this reason, according to the embodiment, it is possible to make an annotation using someone else's label while securing confidentiality in a user's action without opening the action information and the label to the public.

In addition, according to the embodiment, since the label is assigned to the action information using a hierarchical relation within an organization of the users, it is possible to utilize the label assigning of users who take a similar action and thus to efficiently assign the label thereto.

Hardware Configuration

Exemplary hardware configurations of the client devices 10-1 to 10-n and the server device 20 according to the embodiment will be described. The client devices 10-1 to 10-n and the server device 20 according to the embodiment are provided with a control device such as a CPU, a storage device such as a ROM or a RAM, an external storage device such as an HDD, a display device such as a display, an input device such as a keyboard or a mouse, and a communicating device such as a communication interface, and thus can be realized by hardware using a normal computer.

The program which is executed by the client devices 10-1 to 10-n and the server device 20 according to the embodiment may be stored in a computer-readable storage medium, such as a CD-ROM, a CD-R, a memory card, a digital versatile disk (DVD), or a flexible disk (FD), as files of an installable format or an executable format and provided as a computer program product.

In addition, the program which is executed by the client devices 10-1 to 10-n and the server device 20 according to the embodiment may be stored on a computer connected to a network such as the Internet, downloaded through the network, and provided. In addition, the program which is executed by the client devices 10-1 to 10-n and the server device 20 according to the embodiment may be provided or distributed through a network such as the Internet. In addition, the program which is executed by the client devices 10-1 to 10-n and the server device 20 according to the embodiment may be provided by the ROM or the like in which the program is installed in advance.

The program which is executed by the client devices 10-1 to 10-n and the server device 20 according to the embodiment has a module configuration for realizing the respective units on the computer. As actual hardware, the CPU reads and executes the program from the HDD on the RAM, thereby realizing the respective units on the computer.

For example, the respective steps in the flowchart of the foregoing embodiment may be performed in a different order, a plurality of steps may be performed at the same time, or the order of performing the respective steps may be changed every time the processing in the flowchart is performed, without departing from the features of the respective steps.

As described above, according to the forgoing embodiment, the annotation using another person's label can be realized while securing confidentiality in a user's action.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A server device comprising:
a first registering unit configured to acquire first action information that is a piece of action information regarding an action performed by a first user from a client device used by the first user, and register the first action information in an action information storage unit in which pieces of action information of a plurality of users are stored in association with labels of the respective pieces of action information, each piece of action information including user identification information for identifying a user who performs an action;
a hierarchical relation information storage unit configured to define, as a group-group hierarchical relation, as a hierarchical relation within an organization to which users belong using the user identification information, the organization having an upper group and a lower group;
a second registering unit configured to specify at least one piece of action information similar to the first action information among the pieces of action information, extract at least one piece of action information that is included in the first action information among the specified piece of action information, the extracted piece of action information including the user identification information having a hierarchical relation with first user identification information indicating the first user, and register a label associated with the extracted piece of action information in the action information storage unit in association with the first action information;
a providing unit configured to provide the label associated with the first action information to the client device; and
one or more processors configured to execute at least the first registering unit, the second registering unit, and the providing unit.

2. The device according to claim 1, wherein the hierarchical relation information is information for defining the hierarchical relation between users within an organization to which the users belong.

3. The device according to claim 1, wherein
the second registering unit specifies a piece of action information of which the user identification information is matched with the user identification information included in second action information among the pieces of action information, the second action information being most similar to the first action information among the extracted piece of action information, the specified piece of action information being associated with any label which is associated with the second action information, and
the second registering unit registers the label associated with the specified action information and the label associated with the second action information into the action information storage unit, associating the labels with the first action information.

4. The device according to claim 1, wherein
the second registering unit specifies a piece of action information of which the user identification information is matched with the user identification information included in second action information among the pieces of action information, the second action information being most similar to the first action information, the specified piece of action information being associated with any label which is associated with the second action information, and
the second registering unit registers the label associated with the specified action information and the label associated with the second action information in the action information storage unit, associating the labels with the first action information.

5. The device according to claim 1, wherein
each piece of action information includes feature data that indicates a feature of the action of the user as an action subject, and
the second registering unit specifies a piece of action information of which the feature data is similar to that of the first action information among the pieces of action information.

6. An annotation system comprising:
a server device; and
a client device, wherein
the server device includes
a first registering unit configured to acquire first action information that is a piece of action information regarding an action performed by a first user from a client device used by the first user, and register the first action information in an action information storage unit in which pieces of action information of a plurality of users are stored in association with labels of the respective pieces of action information, each piece of action information including user identification information for identifying a user who performs an action;
a hierarchical relation information storage unit configured to define, define a group-group hierarchical relation, a hierarchical relation within an organization to which users belong using the user identification information, the organization having an upper group and a lower group;
a second registering unit configured to specify at least one piece of action information similar to the first action information among the pieces of action information, extract at least one piece of action information that is included in the first action information among the specified piece of action information, the extracted piece of action information including the user identification information having a hierarchical relation with first user identification information indicating the first user, and register a label associated with the extracted piece of action information in the action information storage unit in association with the first action information, and
the client device includes
an acquiring unit configured to acquire the label associated to the first action information from the server device, and register the acquired label in association with the first action information which is stored in a first user action information storage unit storing the action information of the first user; and
a processor configured to execute at least the acquiring unit.

7. An annotation method comprising:
acquiring first action information that is a piece of action information regarding an action performed by a first user from a client device used by the first user;
registering the first action information in an action information storage unit in which pieces of action information of a plurality of users are stored in association with labels of the respective pieces of action information, each piece of action information including user identification information for identifying a user who performs an action;
defining, as a group-group hierarchical relation, a hierarchical relation within an organization to which users belong using the user identification information, the organization having an upper group and a lower group;
specifying at least one piece of action information similar to the first action information among the pieces of action information;
extracting at least one piece of action information that is included in the first action information among the specified piece of action information, the extracted piece of action information including the user identification information having a hierarchical relation with the first user identification information indicating the first user;
registering a label associated with the extracted piece of action information in the action information storage unit in association with the first action information; and
providing the label associated with the first action information to the client device.

8. A computer program product comprising a non-transitory computer-readable medium containing a program executed by a computer, the program causing the computer to execute:
acquiring first action information that is a piece of action information regarding an action performed by a first user from a client device used by the first user;
registering the first action information in an action information storage unit in which pieces of action information of a plurality of users are stored in association with labels of the respective pieces of action information, each piece of action information including user identification information for identifying a user who performs an action;
defining, as a group-group hierarchical relation, a hierarchical relation with an organization to which users belong using the user identification information, the organization having an upper group and a lower group;

specifying at least one piece of action information similar to the first action information among the pieces of action information;
extracting at least one piece of action information that is included in the first action information among the specified piece of action information, the extracted piece of action information including the user identification information having a hierarchical relation with first user identification information indicating the first user;
registering a label associated with the extracted piece of action information in the action information storage unit in association with the first action information; and
providing the label associated with the first action information to the client device.

* * * * *